（12） United States Patent
Harrup et al.

(10) Patent No.: US 6,904,988 B2
(45) Date of Patent: Jun. 14, 2005

(54) SUSPENDED WHEEL END POWERED THROUGH TRAILING ARM

(75) Inventors: Clive Harrup, Bromham (GB); Dennis A. Kramer, Troy, MI (US); Mehmet S. Ciray, Greenwood, IN (US); Silvio M. Yamada, Gahanna, OH (US); Dean M. House, Pataskala, OH (US); David K. Platner, Shelby, MI (US); Dale J. Eschenburg, Clinton Township, MI (US); Dale K. Bell, Ortonville, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 89 days.

(21) Appl. No.: 10/329,967

(22) Filed: Dec. 27, 2002

(65) Prior Publication Data

US 2004/0124019 A1 Jul. 1, 2004

(51) Int. Cl.⁷ .................................................. B60K 1/00
(52) U.S. Cl. ..................................................... 180/65.6
(58) Field of Search ............................. 180/65.1, 65, 6, 180/220, 65.3

(56) References Cited

U.S. PATENT DOCUMENTS

| | | | | |
|---|---|---|---|---|
| 772,916 A | * | 10/1904 | Scott | 470/122 |
| 845,080 A | * | 2/1907 | Hardegen et al. | 180/63 |
| 2,208,710 A | * | 7/1940 | Tjaarda | 180/65.6 |
| 5,924,504 A | | 7/1999 | Ruppert, Jr. et al. | |
| 5,960,901 A | * | 10/1999 | Hanagan | 180/210 |
| 6,341,660 B1 | | 1/2002 | Schiller | |
| 6,516,911 B1 | * | 2/2003 | Mayer et al. | 180/220 |
| 6,755,272 B2 | * | 6/2004 | Friesen | 180/230 |

FOREIGN PATENT DOCUMENTS

JP 5-139366 * 6/1993

* cited by examiner

Primary Examiner—Bryan Fischmann
(74) Attorney, Agent, or Firm—Carlson, Gaskey & Olds

(57) ABSTRACT

A drive train assembly including an electric motor mounted to the frame of the motor vehicle and a trailing arm. The trailing arm is attached to the frame of a motor vehicle such that a pivot point is common to an axis of rotation of a shaft of the electric motor. The electric motor drives a drive mechanism supported by the trailing arm to drive a wheel suspended at a distal end of the trailing arm. The trailing arm pivots about the axis of rotation of the motor shaft thereby reducing the suspended mass of the vehicle and improving ride and handling characteristics.

21 Claims, 6 Drawing Sheets

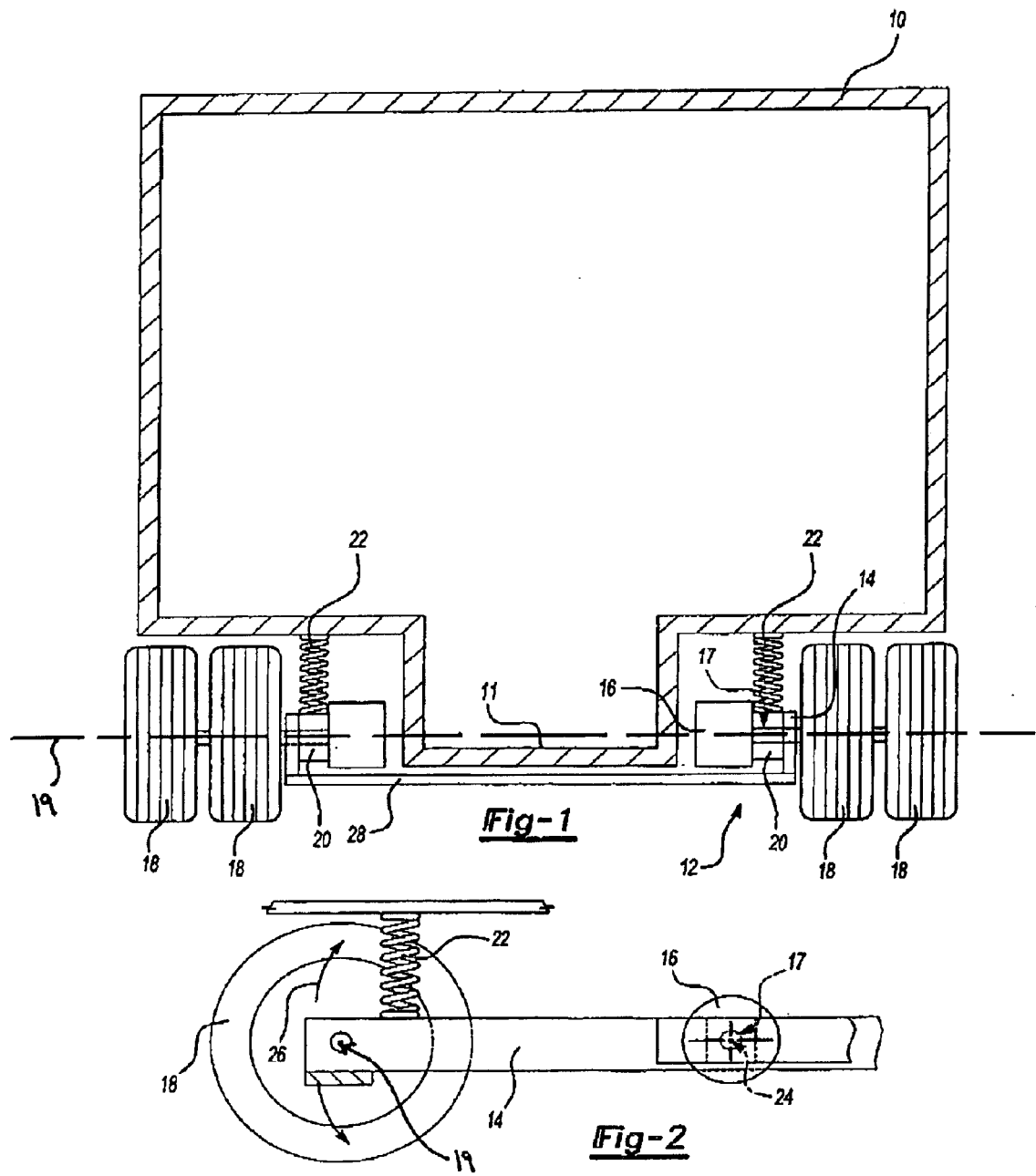

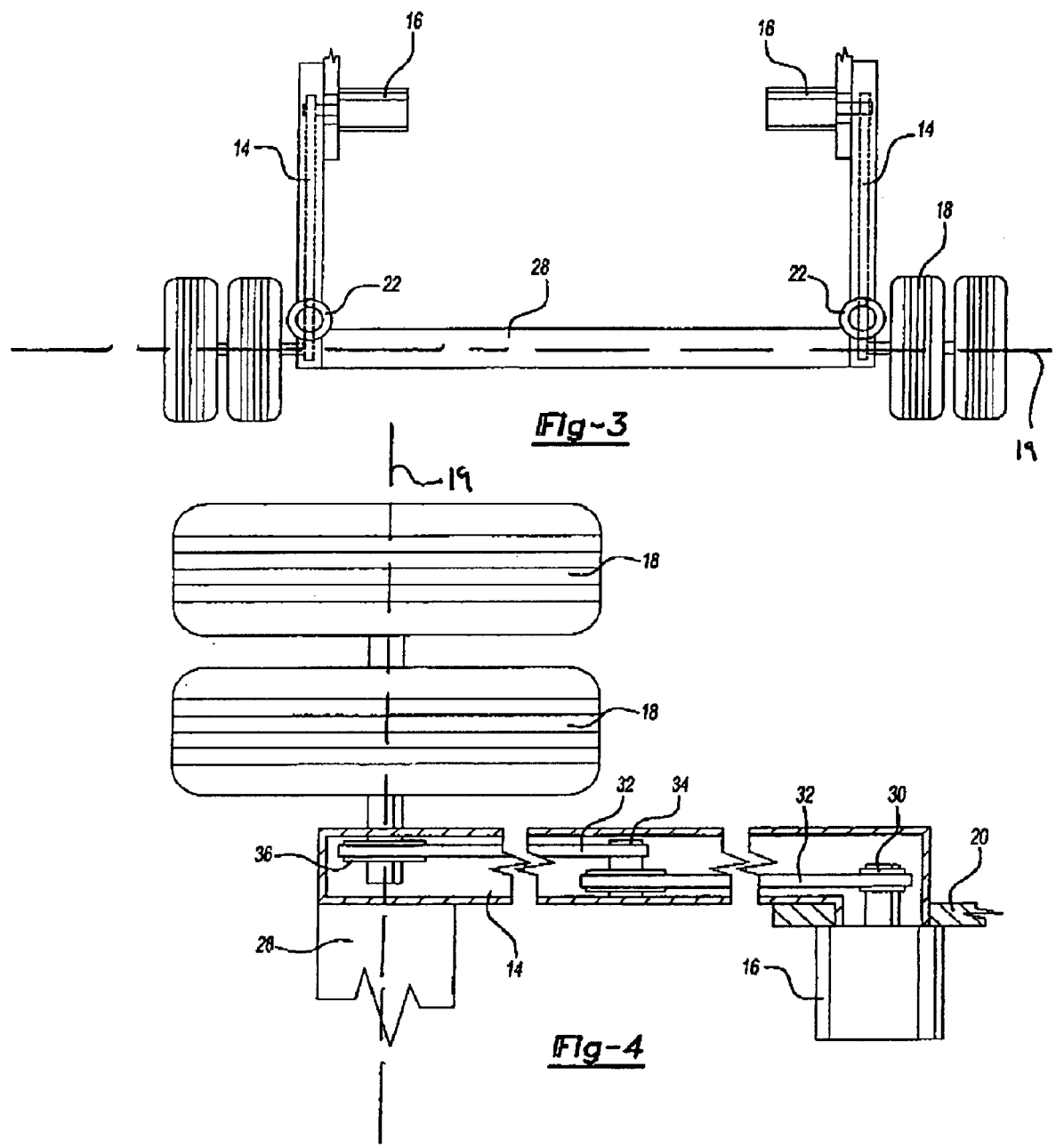

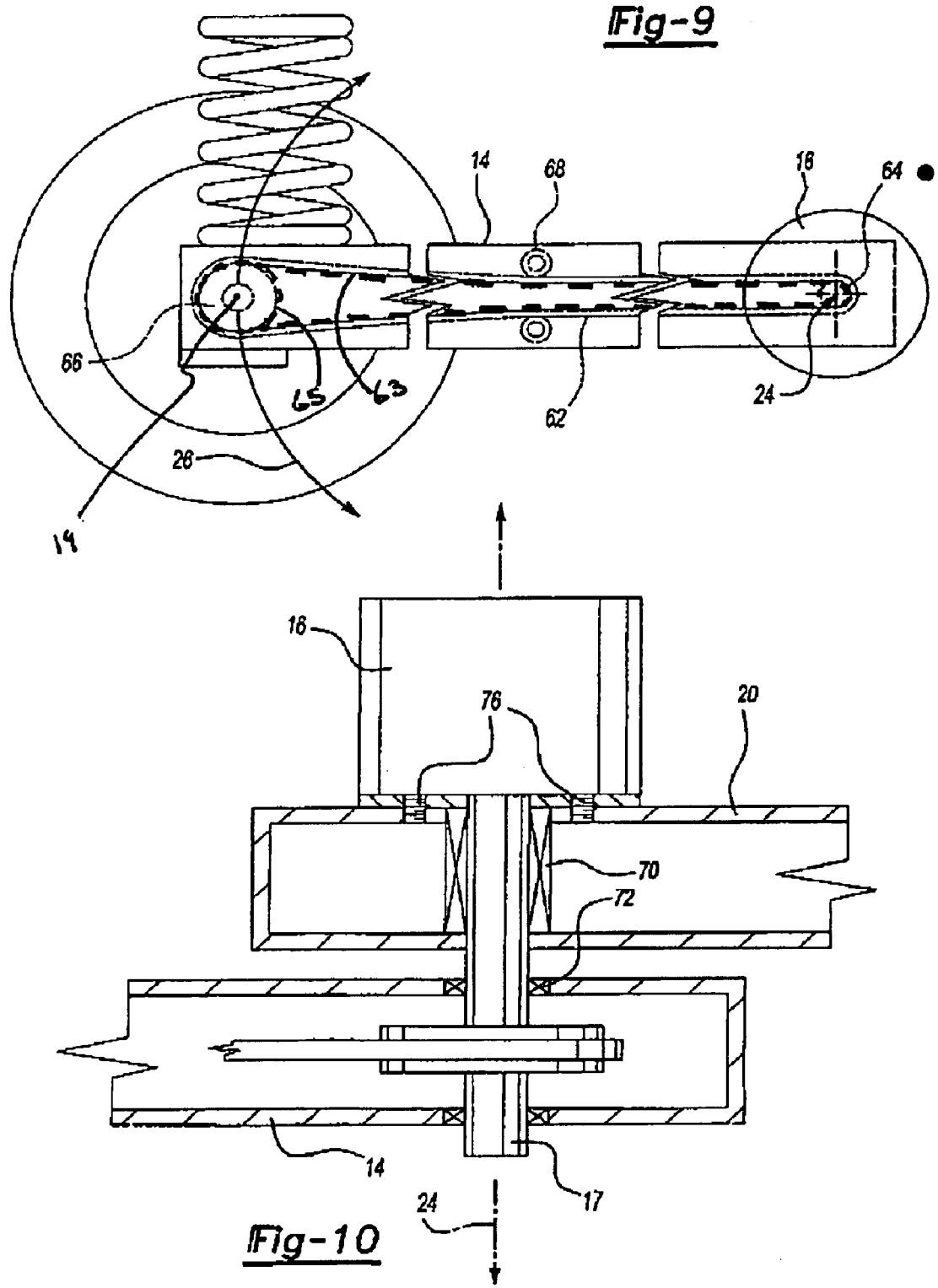

SUSPENDED WHEEL END POWERED THROUGH TRAILING ARM

BACKGROUND OF THE INVENTION

This invention relates generally to a mounting structure for electric motors utilized to drive vehicle axles, and specifically to a mounting structure for a frame mounted electric motor.

Typically, mass transit vehicles such as buses and trolleys provide a floor substantially lower than common in other vehicles to aid loading and unloading of passengers. The low floor is made possible by an inverted axle assembly that transmits power to the driven wheels along an axis other than the axis of wheel rotation. Conventional inverted axle assemblies are bulky and complex. One known alternative to an inverted drive axle is the use of a single electric motor at each drive wheel. The electrical motor at each drive wheel does not require an axle assembly extending laterally across the vehicle and therefore allows the lower floor.

Typically, electric motors are mounted such that the driven shaft of the electric motor is concentric with the axis of rotation of the driven wheel. Such a configuration requires that the electric motor become part of the mass suspended from vehicle frame. Electric motors are of considerable weight and this weight is added to the suspended mass that also includes the driven wheel and any suspension members. The additional weight requires that the suspension members be of a larger capacity in order to accommodate the added weight of the electric motor.

An improvement on suspending the motor parallel with the driven wheel includes mounting of the electric motor transversely relative to the driven axle. The transverse mounting of the motor provides for additional space in the motor vehicle to allow for the lower floor to be extended outward towards the outboard portion of the motor vehicle. However, in this configuration the motor is still part of the suspended mass along with the wheel and the other suspension components.

Accordingly, it is desirable to design an electric motor mounting assembly for driving vehicle wheels that does not require the electric motor to be suspended from the frame of the vehicle.

SUMMARY OF THE INVENTION

An embodiment of this invention is a frame mounted electric motor driving an independently suspended wheel through a trailing arm suspension member.

The electric motor drive assembly of this invention includes a motor attached to a frame of the motor vehicle and a wheel suspended from a distal end of a trailing arm. The trailing arm is attached to the motor vehicle at a point along an axis common with the axis rotation of the electric motor. The trailing arm pivots about the axis of rotation of the electric motor to accommodate road inconsistencies. A suspension member attached to the trailing arm absorbs shocks and movement of the trailing arm about the axis. Mounting of the electric motor at the axis of pivoting movement of the trailing arm eliminates the need to provide suspension components capable of accommodating the weight of the electric motor.

The drive mechanism for driving the wheel is disposed within the trailing arm. In one embodiment the drive mechanism is a pulley arrangement where the electric motor includes a drive pulley driving a belt. An intermediate pulley is included and mounted for rotation within the trailing arm. A first pulley mounted on the shaft of the electric motor drives the intermediate pulley which in turn drives a second belt which drives a driven pulley mounted on the axle shaft to drive the driven wheel.

The trailing arms of this invention may be of the independent variety allowing for wheels on opposite sides of the vehicle to move independently of the each other. Further, this invention may also include a cross member that attaches the trailing arms to each other such that they move as a single unit. The suspension member mounted to the trailing arms may be of any type known by a worker knowledgeable in the art including coil springs, leaf springs and airbag type suspension.

In another embodiment of this invention a shaft is suspended within the trailing arm and driven by the electric motor. The shaft includes a bevel gear on both ends that correspond to ring gears driven on one end by the electric motor. The bevel gear mounted on the axle of the wheel is then driven by way of the shaft to provide rotational torque.

In yet another embodiment of this invention a gear assembly is provided and supported within the trailing arm. The gear assembly is driven by the electric motor to provide the required torque to move the wheels. The gear box assembly is pivotal about the axis of rotation of the shaft driven by the electric motor and includes an output shaft attached to the wheel.

The electric motor in one embodiment is rigidly attached to the frame member and the trailing arm is pivotally supported by the rotating shaft of the electric motor. In this embodiment, the frame member includes a bearing structure through which the rotating shaft of the electric motor extends. The trailing arm also includes bearing structure to allow the trailing arm to rotate relative to rotation of the shaft of the electric motor.

In another embodiment of the mounting configuration of the electric motor, the electric motor is mounted to the trailing arm and the trailing arm is mounted such that it pivots about an axis common with the axis of rotation of the electric motor. In this embodiment the trailing arm includes a hub portion that extends through a frame of the vehicle. The hub portion rotates relative to the frame and includes a bearing structure supporting rotation of the trailing arm.

Accordingly, this invention provides an electric motor mounting assembly for driving vehicle wheels that does not require suspension of the electric motor from the frame of the vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as followed:

FIG. 1 is a schematic view of a mass transit vehicle having the drive assembly of this invention;

FIG. 2 is a schematic illustration of the drive assembly;

FIG. 3 is a top view of an embodiment of the drive assembly of this invention;

FIG. 4 is a schematic view of an embodiment of the drive assembly;

FIG. 9 is a schematic view of yet another embodiment of the drive assembly;

FIG. 10 is a schematic view of a mounting method for the motor; and

DETAILED DESCRIPTION OF THE PREFERRED EMBODIMENT

Figure 5:
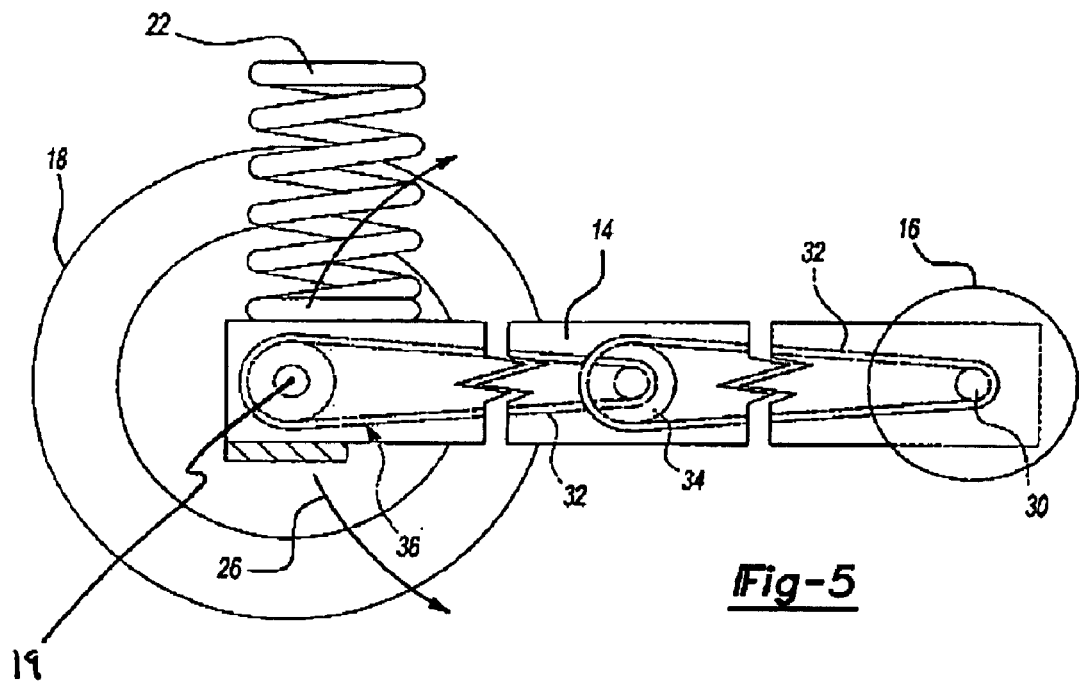
FIG. 5 is another schematic view of the embodiment of the drive assembly shown in FIG. 4.

Referring to FIGS. 1 and 2, an embodiment of this invention is a drive assembly 12 for a low floor vehicle 10 and includes an electric motor 16 mounted to a frame member 20 to drive a wheel 18. The wheel 18 is attached to a distal end of a trailing arm 14. The trailing arm 14 pivots about an axis 24 common with the axis of rotation of the electric motor 16. A shaft 17 of the electric motor drives a drive mechanism supported by the trailing arm 14 to drive the wheel 18. The trailing arm 14 includes a suspension member 22 supporting the wheel 18 and accommodating road and loading inconsistencies. Preferably, the vehicle 10 is a mass transit vehicle such as a bus or trolley. In such vehicles it is desirable for the floor 11 of the vehicle 10 to be as low as possible to aid loading and unloading of passengers. The floor 11 of the vehicle 10 is preferably disposed even with or below an axis 19 about which the wheels 18 rotate. In other words, the floor 11 is on a plane that is even with or below the axis 19 for wheels 18.

The electric motor 16 is supported by the frame member 20 and not by the suspension member 22. This is accomplished by mounting the electric motor 16 such that the shaft 17 of the electric motor 16 rotates about an axis common to the pivot point of the trailing arm 14. The trailing arm 14 pivots about the axis 24 in an arc indicated at 26.

Preferably, each wheel 18 is disposed on opposite sides of the motor vehicle 10 and moves independent of the other. Referring to FIG. 3, another embodiment of this invention is shown where each of the trailing arms 14 are attached by way of cross member 28. Use of the cross member 28 provides for a more rigid suspension. It can be applied to configurations where strength and rigidity considerations outweigh those of ride considerations. The cross member 28 attached to each of the trailing arms 14 disposed on opposite sides of the motor vehicle prevents the trailing arms from twisting or moving in a plane other than that compensated by the suspension member 22.

Referring to FIG. 4. an embodiment of the drive assembly is schematically shown and comprises a belt 32 driven by the electric motor 16. A drive pulley 30 rotated by the electric motor 16 rotates an intermediate pulley 34 which in turn drives the driven pulley 36. Preferably, the diameters of each of the pulleys 30, provide a ratio that provides for speed reduction from a relatively high speed of the electric motor 16 to a lower final speed of the driven pulley 36. Preferably, a high speed electric motor is used along with the desired speed reduction ration to produce a desired wheel torque. It should also be understood that a worker skilled in the art would understand that each application requires a different ratio between drive and driven pulleys and that any such combination are within the contemplation of this invention.

Referring to FIG. 5, a side view of the belt drive embodiment of FIG. 4 is schematically shown. The electric motor 16, by way of drive pulley 30, drives an intermediate pulley 34 which in turn drives the driven pulley 36. The intermediate pulley 34 is sized relative to the drive pulley 30 and driven pulley 36 to provide the desired speed reduction from the electric motor 16 to the driven pulley 36. The trailing arm pivots about the electric motor shaft 17 in an arc 26.

The suspension member 22 may be of any type known to a worker in this art. It is within the contemplation of this invention that the suspension member 22 may comprise a coil spring member, a leaf spring or an airbag type suspension. Further, the weight of the motor 16 becomes part of the vehicle 10. The suspension member 22 has to support the vehicle weight 10, including the motor 16. The weight of the axle significantly influences ride and handling. The axle on which the wheels 18 rotate becomes significantly lighter to improve the ride and handling of the vehicle. Removing the requirement of supporting and accounting for the weight of the electric motor 16 on the axle, the ride and handling characteristics of the motor vehicle 10 are improved.

Figure 6:
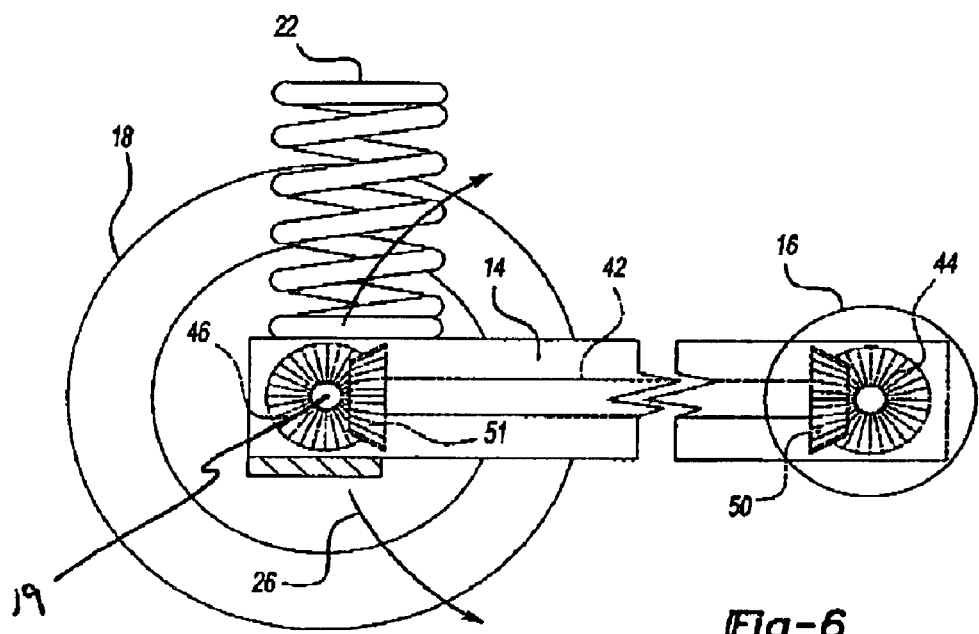
FIG. 6 is a side view of another embodiment of the drive assembly.

Referring to FIG. 6, another embodiment of the drive assembly is schematically illustrated and includes a shaft 42 supported for rotation within the trailing arm 14 and includes a bevel gear 50 disposed on each end. The bevel gear 50 engages drive gear 44 turned by the electric motor 16. Opposite the drive gear 44 on the shaft 42 is a second bevel gear 51 engaged to driven gear 46 to rotate wheel 18. The relative size of the bevel gears 44, 46, 50, 51, are such that they provide the reduction in speed from the motor 16 to the wheel 18 as required for the specific application.

Figure 7:
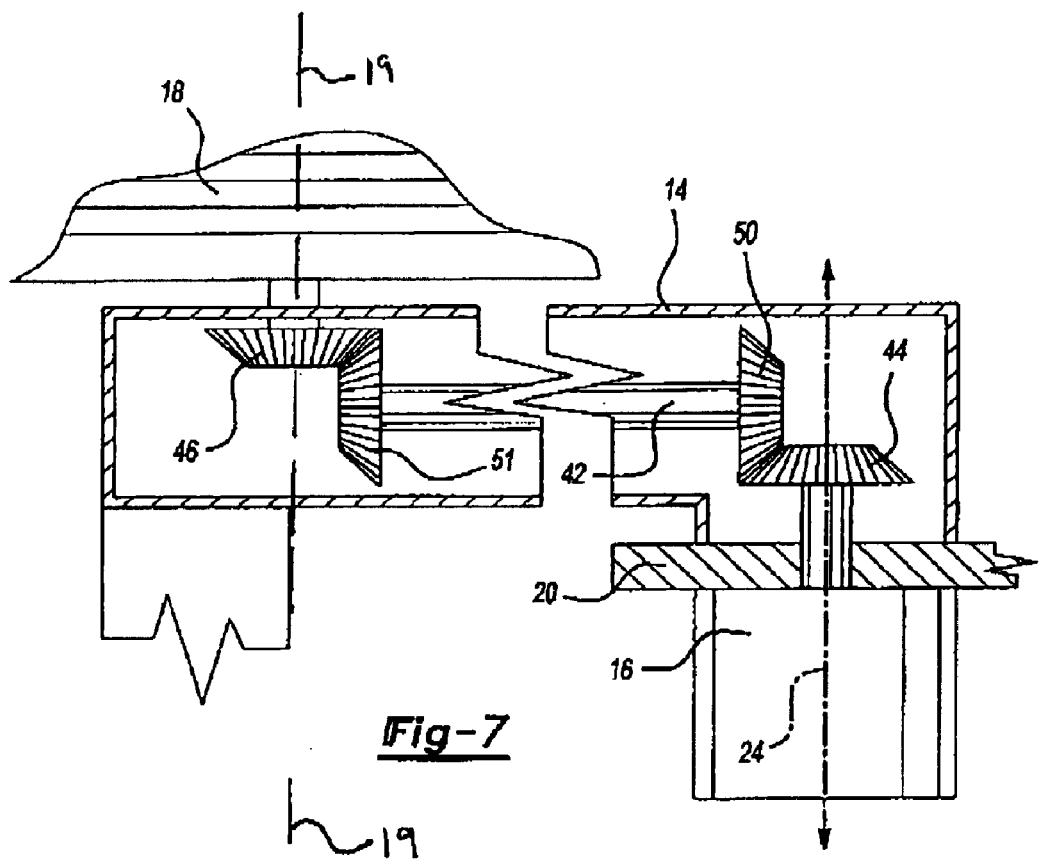
FIG. 7 is a top schematic view of the embodiment shown in FIG. 6.

Referring to FIG. 7, the top schematic view of the embodiment of FIG. 6 is shown and illustrates how the trailing arm 14 pivots about the axis 24. The shaft 42 is supported for rotation by the trailing arm 14 by any means known in the art.

Figure 8:
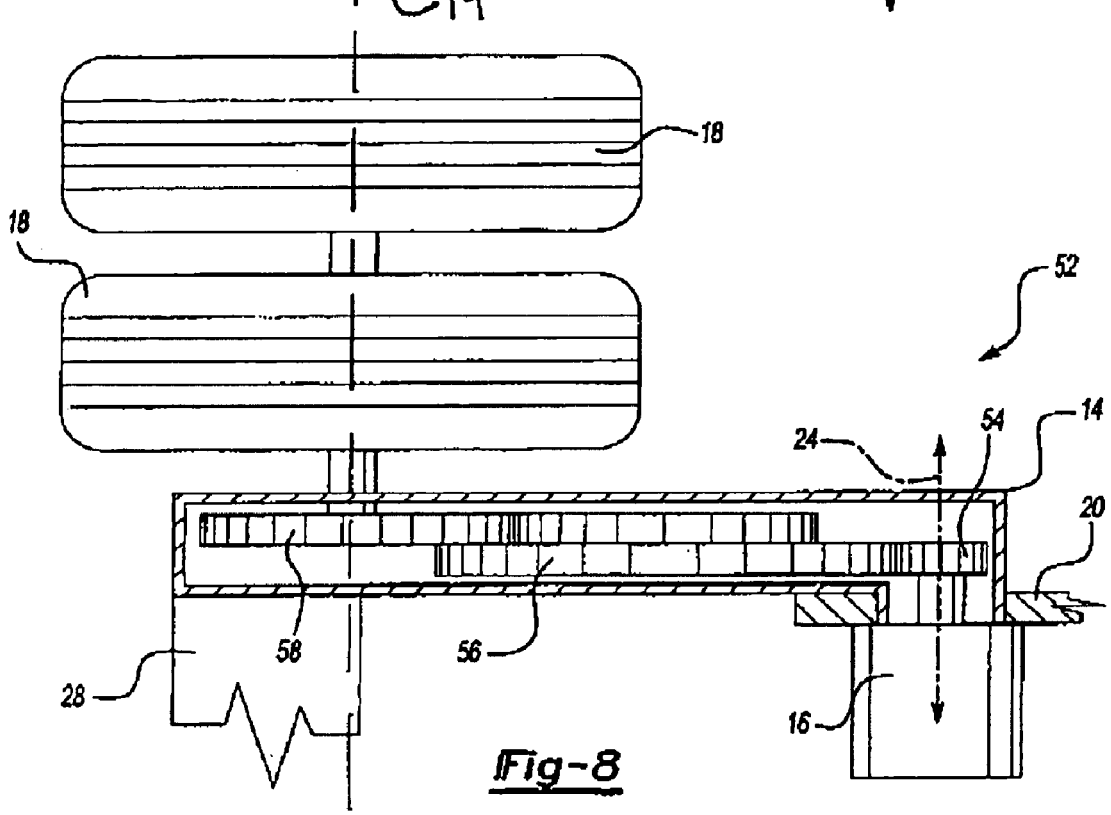
FIG. 8 is a schematic view of another embodiment of the drive assembly.

Referring to FIG. 8, another embodiment of the drive assembly is schematically shown and generally indicated at 52. In this embodiment, the electric motor 16 includes a drive gear 54 which drives an intermediate gear 56 which in turn drives a driven gear 58. All of the gears are supported by the trailing arm 14 for pivotal rotation about the axis 24. The specific configuration of the gears 54, 56, 58 are such that the speed is reduced from the electric motor 16 to the wheel 18.

Referring to FIG. 9, another embodiment of this invention is schematically shown as indicated at 60. In this embodiment, a single belt 62 is used to transmit rotational torque from a shaft 64 of the electric motor 16 to the wheel 18. In this embodiment, tensioning gears 68 are disposed between the electric motor and the wheel 18 and are supported within the trailing arm 14. The tensioning pulleys maintain adequate tension on the belt 62 to maintain the belt in driving contact with the driven gear 66. The belt 62 includes a series of grooves 63 cooperating with corresponding grooves 65 on each of the gears 66, 68. As appreciated, although belts are used and shown as an example, other methods of transmitting rotational torque from the electric motors 16 to the wheel 18 are within the contemplation of this invention and include the such devices as chains, toothed drive belts or other devices as are known to a worker skilled in this art.

Referring to FIG. 10, a mounting method of this invention is schematically shown. Preferably, the electric motor 16 is rigidly mounted to a frame member 20 of the vehicle 10. The electric motor 16 may be fastened to the frame member 20 of the vehicle 10 by way of threaded fasteners shown at 76. As appreciated, any mounting method as is known by a worker skilled in the art would be within the contemplation of this invention. Bearings 70 disposed within the frame member 20 support the shaft 17 for rotation relative to the frame. The trailing arm 14 is mounted to the shaft 17 and includes bearing assembly 72 to provide for rotation of the trailing arm 14 relative to rotation of the shaft 17. In this embodiment, the shaft 17 of the electric motor supports the trailing arm 14 and also supports the driven pulley.

Figure 11:
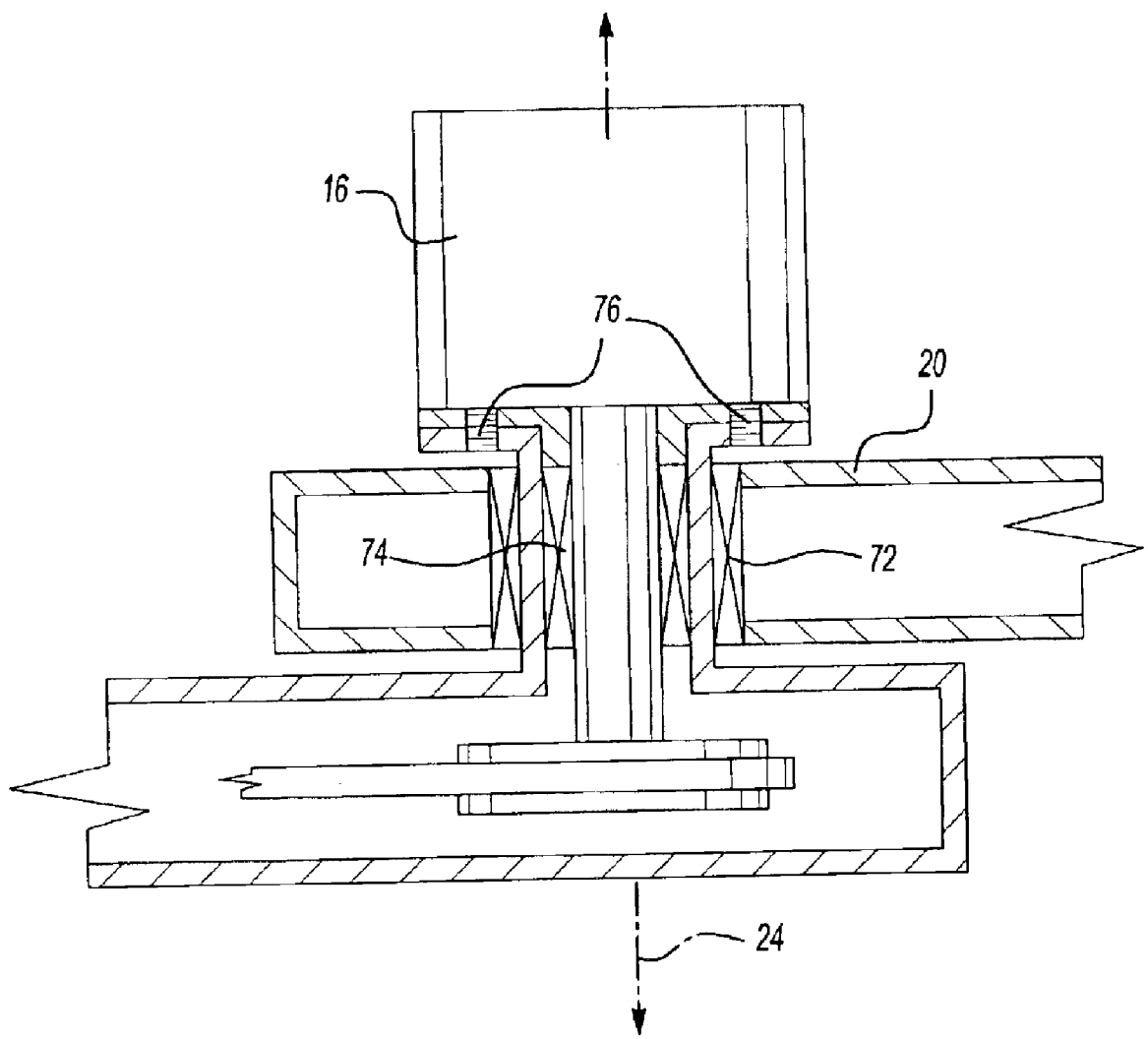
FIG. 11 is another embodiment of a mounting method for the motor.

Referring to FIG. 11, another embodiment of this invention includes an electric motor 16 mounted to the trailing arm 14. The trailing arm is mounted to the frame member 20 and is supported by the frame member 20 by bearing assembly 72. The trailing arm 14 in this embodiment is supported by the bearing 72 to allow rotation of the trailing arm 14 relative to the frame member 20. The electric motor 16 rotates and moves with the trailing arm 14 such that additional bearing assemblies are not required to support and allow rotation of the trailing arm relative to the rotating shaft as is the case in the embodiment shown in FIG. 10. In this embodiment, bearing 74 supports the shaft 17 of the electric motor 16 to allow rotation of the shaft within the trailing arm 14. Although a specific configuration for mounting of the electric motor 16 is shown and illustrated in FIGS. 10 and 11 it is within the contemplation of this invention that any mounting method of mounting an electric motor such that the axis of rotation of the electric motor shaft 17 is common to the axis of pivotal rotation of the trailing arm 14.

The drive assembly of this invention reduces the unsuspended mass of the vehicle to improve ride and handling characteristics. As shown this is accomplished by mounting the electric motor 16 such that the drive shaft 17 of the electric motor 16 is common to an axis of pivotal movement of the trailing arm of the suspension member. Further, mounting of the electric motor at the pivot point of the trailer arm is facilitated by the inclusion of a drive mechanism that is supported by the trailing arm and is disposed within or through the trailing arm to transfer rotational torque from the electric motor to the drive wheel 18.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A low floor vehicle and drive assembly comprising:
   a first electric motor supported by a first frame, said first electric motor including a first shaft rotatable about a first axis,
   a second electric motor supported by a second frame spaced a distance laterally from said first frame, said second electric motor including a second shaft rotatable about said first axis;
   a first trailing arm and a second trailing arm each pivotal about said first axis, said first trailing arm and said second trailing arm having respective distal ends;
   a first wheel mounted for rotation to said distal end of said first trailing arm and a second wheel mounted for rotation to said distal end of said second trailing arm; and
   a first drive mechanism supported along said first trailing arm and a second drive mechanism supported along said second trailing arm for transferring rotational torque from said first and said second shafts to corresponding ones of said first wheel and said second wheel; and
   a floor disposed between said first electric motor and said second electric motor within said distance between said first frame and said second frame.

2. The assembly of claim 1, wherein said first wheel and said second wheel rotate about a second axis different from said first axis; and said second axis is disposed at least within a plane common with a plane established by said floor.

3. The assembly of claim 1, wherein said floor establishes a plane and said first and second wheels rotate about a second axis that is disposed above said plane.

4. The assembly of claim 1, further including at least one suspension member, said suspension member supporting said distal ends of said first trailing arm and said second trailing arm.

5. The assembly of claim 1, wherein said first trailing arm is pivotally attached for movement relative to said first shaft and said second trailing arm is pivotally attached for movement relative to said second shaft.

6. The assembly of claim 5, further including a bearing assembly disposed between said first shaft and said first trailing arm and said second shaft and said second trailing arm providing movement of said first and second trailing arms relative to said first and said second shafts.

7. The assembly of claim 1, wherein said first trailing arm is attachable to said first frame and said second trailing arm is attachable to said second frame.

8. The assembly of claim 1, wherein said first and said second drive mechanisms are disposed within a channel defined by each of said first and said second trailing arms.

9. The assembly of claim 1, wherein each of said first and second drive mechanisms includes a belt driven between at least two pulleys.

10. The assembly of claim 9, wherein each of said, first and said second drive mechanisms includes a first pulley mounted to said first and said second shafts that is smaller in diameter than a second pulley which is mounted to drive said first and said second wheels.

11. The assembly of claim 9, further including at least one tensioning pulley disposed along said belt.

12. The assembly of claim 9, wherein said belt includes a series of grooves cooperating with corresponding grooves on each of said at least two pulleys.

13. The assembly of claim 1, wherein said first drive mechanism and said second drive mechanism includes a chain driven between at least two sprockets.

14. The assembly of claim 1, wherein said first drive mechanism and said second drive mechanism includes a rotating shaft disposed transverse to said first axis and supported within said trailing arm.

15. The assembly of claim 1, wherein said first drive mechanism and said second drive mechanism includes a series of complimentary gears supported within said first and said second trailing arms.

16. The assembly of claim 1, wherein each of said first and said second drive mechanisms includes a speed reduction between each of said first shaft and said first wheel and said second shaft and said second wheel.

17. A drive system for a low floor vehicle comprising:
   a first electric motor including a first rotatable shaft and a second electric motor separated a lateral distance from said first electric motor and including a second rotatable shaft, wherein each of said first rotatable shaft and said second rotatable shaft rotate about a common axis;

a first trailing arm pivotal about said common axis and said first rotatable shaft including a first drive mechanism supported along said first trailing arm for transferring rotation from said first rotatable shaft to a first wheel assembly rotatable about a first axis;

a second trailing arm pivotal about said common axis and said second rotatable shaft including a second drive mechanism supported along said second trailing arm for transferring rotation from said second rotatable shaft to a second wheel assembly rotatable about a second axis, wherein said lateral distance between said first electric motor and said second electric motor is adapted to accept a vehicle floor and said first axis and said second axis are disposed on respective planes above a plane established by the vehicle floor.

18. The system as recited in claim 17, wherein said common axis is disposed above the plane established by the vehicle floor.

19. The system as recited in claim 17, including a cross member having a first end and a second end, wherein said first end is attached to said first trailing arm and said second end is attached to said second trailing arm such that said first trailing arm and said second trailing arm pivot about said common axis in unison.

20. The system as recited in claim 17, wherein said first drive mechanism is housed within said first trailing arm, and said second drive mechanism is housed within said second trailing arm.

21. The system as recited in claim 20, wherein said first drive mechanism and said second drive mechanism comprise a drive pulley and a drive belt.

* * * * *